R. KRONENBERG.
VEHICLE WHEEL.
APPLICATION FILED JAN. 26, 1914.

1,156,153.

Patented Oct. 12, 1915.

Witnesses:
C. D. Swett.
B. H. Davis

Inventor
per R. Kronenberg
F. Dittmar
Attorney.

UNITED STATES PATENT OFFICE.

RUDOLF KRONENBERG, OF OHLIGS, GERMANY.

VEHICLE-WHEEL.

1,156,153.   Specification of Letters Patent.   Patented Oct. 12, 1915.

Application filed January 26, 1914. Serial No. 814,503.

*To all whom it may concern:*

Be it known that I, RUDOLF KRONENBERG, subject of the King of Prussia, and resident at Ohligs, in the Province of the Rhine, Kingdom of Prussia, German Empire, have invented a certain new and useful Improved Vehicle-Wheel, of which the following is a specification.

This invention relates to an improved vehicle wheel for heavy vehicles with solid rubber tires. In this construction the wheel is composed of a pressed metal hub and spokes, upon which a metal rim serving for the direct reception of the solid rubber tire, is attached without intermediate parts. In this manner, the construction of the heavy vehicle wheel is materially simplified and at the same time rendered stronger.

In the accompanying drawing, a wheel of this kind is illustrated as follows:—

Figure 1:
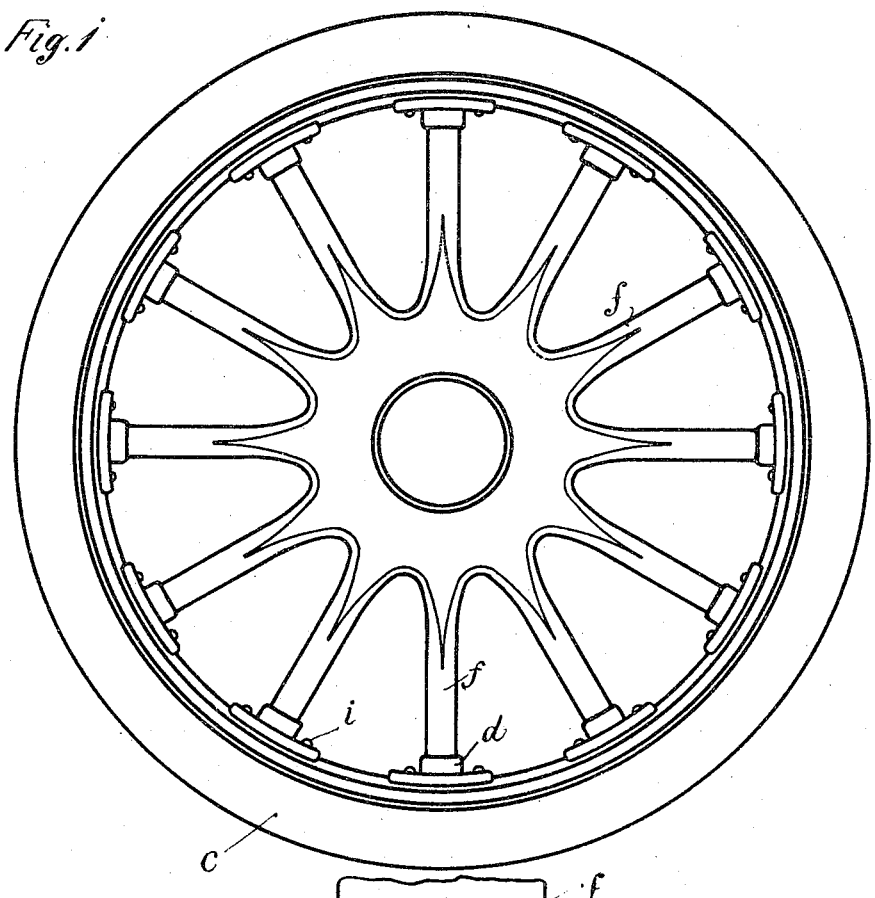
Figure 2:
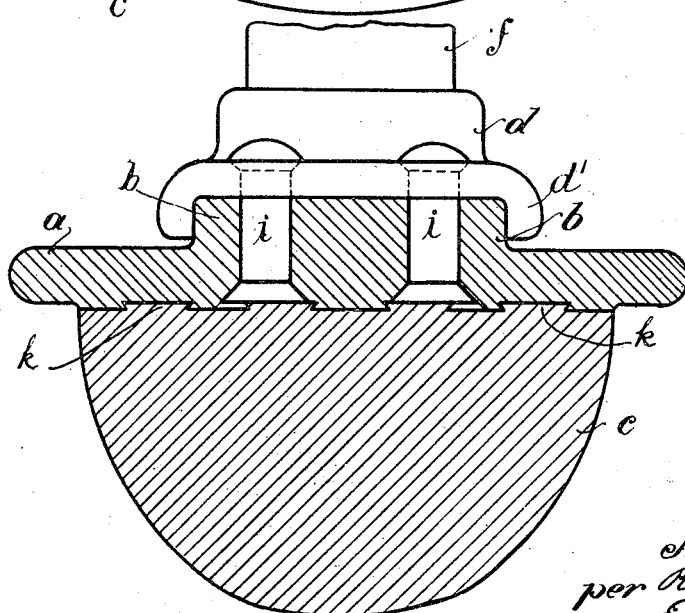

Figure 1 shows an elevation. Fig. 2 shows a section through the tire, the rim and the shoe-shaped member on an enlarged scale.

The improved rim is composed of a single metal ring $a$, provided with an internal ridge $b$. It is connected immediately without any intermediate parts to the pressed metal spokes $f$. This connection is effected by causing the shoe shaped part $d'$ of the spoke ends $d$ to engage on both sides of the ridge $b$ of the rim $a$, in which position they are secured by rivets or bolts $i$. The outer surface of the rim $a$ is provided with the well known dove tail grooves $k$ for the purpose of the direct application of the rubber tire $c$ thereto.

Having now particularly described and ascertained the nature of my said invention and in what manner the same is to be performed, I declare that what I claim is:

In a vehicle wheel having a solid rubber tire, a rim, a central annular ridge on the inner face of said rim, a shoe-shaped member having outwardly directed flanges to engage upon said ridge, spoke ends secured to said shoe-shaped member and bolts to hold together said rim and said shoe-shaped member.

In testimony, whereof I have signed my name to, this specification in the presence of two subscribing witnesses.

RUDOLF KRONENBERG.

Witnesses:
  OSCAR DEPNER,
  BALTHASAR ZORN.

Copies of this patent may be obtained for five cents each, by addressing the "Commissioner of Patents, Washington, D. C."